(12) United States Patent
Oprea et al.

(10) Patent No.: US 10,142,219 B2
(45) Date of Patent: Nov. 27, 2018

(54) METHOD TO ROUTE PACKETS IN A DISTRIBUTED DIRECT INTERCONNECT NETWORK

(71) Applicant: ROCKPORT NETWORKS INC., Ottawa (CA)

(72) Inventors: Dan Oprea, Kanata (CA); Andrei Catana, Ottawa (CA); Udo Neustadter, Carp (CA)

(73) Assignee: ROCKPORT NETWORKS INC., Ottawa, ON (CA)

( * ) Notice: Subject to any disclaimer, the term of this patent is extended or adjusted under 35 U.S.C. 154(b) by 115 days.

(21) Appl. No.: 15/114,722

(22) PCT Filed: Feb. 13, 2015

(86) PCT No.: PCT/CA2015/000081
§ 371 (c)(1),
(2) Date: Jul. 27, 2016

(87) PCT Pub. No.: WO2015/120539
PCT Pub. Date: Aug. 20, 2015

(65) Prior Publication Data
US 2016/0344618 A1    Nov. 24, 2016

Related U.S. Application Data

(60) Provisional application No. 61/939,487, filed on Feb. 13, 2014.

(51) Int. Cl.
*H04L 12/707* (2013.01)
*H04L 12/863* (2013.01)
*H04L 12/721* (2013.01)

(52) U.S. Cl.
CPC .............. *H04L 45/24* (2013.01); *H04L 45/12* (2013.01); *H04L 45/26* (2013.01); *H04L 45/40* (2013.01); *H04L 47/6225* (2013.01); *H04L 45/34* (2013.01)

(58) Field of Classification Search
CPC .......... H04L 45/24; H04L 45/40; H04L 45/34
See application file for complete search history.

(56) References Cited

U.S. PATENT DOCUMENTS 5,898,826 A * 4/1999 Pierce ..................... H04L 45/28
714/4.2
7,457,303 B2  11/2008 Blumrich et al.
(Continued)

FOREIGN PATENT DOCUMENTS

CA    2872831 A1   11/2012
WO    99/11033 A1   3/1999

OTHER PUBLICATIONS

Written Opinion of the International Searching Authority, dated May 8, 2015 for PCT/CA2016/000081 having an international filing date of Feb. 13, 2015.
(Continued)

*Primary Examiner* — Hassan Kizou
*Assistant Examiner* — Deepa Belur
(74) *Attorney, Agent, or Firm* — Smith Tempel Blaha LLC; Gregory Scott Smith

(57) ABSTRACT

The present invention provides a method and apparatus to route data packets across a torus or higher radix topology that has low latency, increased throughput and traffic distribution to avoid hot spots development. Disclosed is a method of routing packets in a distributed direct interconnect network from a source node to a destination node comprising the steps of: discovering all nodes and associated ports; updating the database to include the nodes and ports in the network topology; calculating the shortest path from
(Continued)

every output port on each node to every other node in the topology; segmenting each packet into flits at the output port of the source node; as the flits are segmented, distributing said flits along the shortest path from each output port on the source node to the destination node using wormhole switching, whereby the packets are distributed along alternate maximum disjoint routes in the network topology; and re-assembling and re-ordering the packets at the destination node so that the packets accord with their original order/form.

2 Claims, 18 Drawing Sheets

(56) References Cited

U.S. PATENT DOCUMENTS

| | | | |
|---|---|---|---|
| 2010/0150120 A1* | 6/2010 | Schlicht | H04W 4/20 370/338 |
| 2010/0232322 A1* | 9/2010 | Umayabashi | H04L 12/462 370/256 |
| 2013/0089093 A1* | 4/2013 | Bacthu | H04L 12/4633 370/390 |
| 2014/0169173 A1* | 6/2014 | Naouri | H04L 47/10 370/237 |
| 2014/0223027 A1* | 8/2014 | Mullapudi | H04L 45/66 709/238 |
| 2018/0019944 A1* | 1/2018 | Peng | H04L 45/507 |

OTHER PUBLICATIONS

International Search Report for PCT/CA2016/000081 having an international filing date of Feb. 13, 2015.
International Search Report in International Application PCT/CA2015/000081.
Written Opinion of the International Searching Authority for PCT/CA2015/000081, dated May 8, 2015.

\* cited by examiner

PRIOR ART

PRIOR ART

| 1 | 2 | 3 | 4 | 5 | 6 | Number of hops |
|---|---|---|---|---|---|---|
| 4 | 8 | 10 | 8 | 4 | 1 | Number of nodes |
| 2.6;1.5;1.4;3.6 | 2.4;2.5;1.2; 1.3;3.4;3.5; 4.6;5.6 | 2.3;2.2;1.1;3.3; 3.2;5.4;5.5;6.6; 4.4;4.5 | 2.1;6.5;6.4; 5.2;5.3;4.2; 4.3;3.1 | 5.1;4.1;.6;2 6.3 | 6.1 | Destination nodes starting from source node 1.6 |

36 Nodes (6 x 6) MDP from S=2.4 to D=5.2

ROUTE 5 (x+, x+, x+, y-, y-)
ROUTE 5 (x-, x-, y-, y-, x-)
ROUTE 5 (y-, y-, x+, x+, x+)
ROUTE 7 (y+, y+, y+, x+, x+, x+, y+)

```
1 function create_flit
2   packet = receive_new_packet
3   dest = analize_destination(packet)
4   priority = analize_priority(packet)
5   packet_pointer = 0
6   flit_length = 476
7   do
8     flit =
            create_flit(packet,min(flit_length,(end_of_packet -
            packet_pointer))
9         flit_packet = attach_torus_header(dest,flit,priority)
10        insert flit_packet in send_queue
11      packet_pointer += flit_length
12  while(not end_of_packet)
13 end function
```

FIGURE 13

```
1  function SourceRouting(Graph, source, destination):
2
3  while true:
4      path ← CalculateDijkstra(Graph, source, destination);
5      if path != NULL
6          for each link l of path:
7              cost(l) ← infinity
8          end for
9      else if
10         exit while;
11     end if
12     update_routing_tables
13 end while
14 end function 1  function CalculateAllRoutes(Graph, source):
2
3      initialize_routing_tables
4      for each Dest of topology_list
5          reset_topology_costs(Graph)
6          SourceRouting(Graph,source,Dest)
7      end for
8  end function
```

FIGURE 15

4096 (8x8x8x8) MDP from S= 1000 to D=0

ROUTE 7 (x+,w+,y-,z-,w+,w+,y+);
ROUTE 7 (y+,w+,y-,z-,w+,w+,x+);
ROUTE 7 (z+,z-,y-,z+,z+,z+,z+);
ROUTE 5 (w+,z-,w+,w+,y-);
ROUTE 9 (x-,z-,y-,y-,y-,w+,w+,w+,w-);
ROUTE 5 (y-,w+,w+,w+,z-);
ROUTE 5 (z-,w+,y-,w+,w+);
ROUTE 9 (w-,y-,z-,y-,w+,z-,w+,w+,x-);

ROUTE 7 (x+,z-,w+,w+,w+,y-,y+);
ROUTE 7 (y+,z-,w+,w+,w+,y-,x+);
ROUTE 7 (z+,z+,z+,z+,z-,z+,y-);
ROUTE 5 (w+,w+,z-,y-,w+);
ROUTE 7 (x-,w+,w+,y-,w+,y-,z-);
ROUTE 9 (y-,z+,z+,z+,y-,z+,z-,z+,x-);
ROUTE 7 (z-,z+,z+,z+,z+,y-,z+);
ROUTE 9 (w-,w+,w+,w+,z-,z-,z-,y-,w-);

FIGURE 16

```
1   function send_packet @ dest "n"
2   queue = packet_ready
3   for each dest
4      seq_number = increment_seq_number(dest)
5      for each packet
6        for each flit
7          flit = attach_header
8          port = extract_port_from_route(route)
9          send_packet(port)
10       end for
11          port=increment port
12         if port eq 8  port =1 end if
13     end for
14  end function
```

FIGURE 19

```
1 function link_failure_protection
2   for each port
3      status = read_link_status
4      if status eq down
5         program_passthrough(traffic_to_cpu)
6         send_notification(originator, link_down)
7            topology_update
8      end if
9   end for
10 end function
```

```
1 function link_recovery
2   for each port
3      status = read_link_status
4      if status eq up
5         program_passthrough(traffic_to_hw)
6         send_notification(originator, link_up)
7            topology_update
8      end if
9   end for
10 end function
```

FIGURE 23

METHOD TO ROUTE PACKETS IN A DISTRIBUTED DIRECT INTERCONNECT NETWORK

CROSS-REFERENCE TO RELATED APPLICATION

This application is related to PCT Patent Application No. PCT/CA2014/000652 entitled, "Method and Apparatus to Manage the Direct Interconnect Switch Wiring and Growth in Computer Networks", filed Aug. 29, 2014, the disclosure of which is incorporated herein by reference.

FIELD OF THE INVENTION

The present invention relates to a computer network for data center and cloud data center servers interconnect. In particular, the present invention relates to a method for routing packets in a direct interconnect network implemented on a torus or higher radix topologies such as the "dragonfly" wiring structure.

BACKGROUND OF THE INVENTION

The term Data Centers (DC) generally refers to facilities used to house large computer systems (often contained on racks that house the equipment) and their associated components, all connected by an enormous amount of structured cabling. Cloud Data Centers (CDC) is a term used to refer to large, generally off-premise facilities that similarly store an entity's data.

Network switches are computer networking apparatus that link network devices for communication/processing purposes. In other words, a switch is a telecommunication device that is capable of receiving a message from any device connected to it, and transmitting the message to a specific device for which the message is to be relayed. A network switch is also commonly referred to as a multi-port network bridge that processes and routes data. Here, by port, we are referring to an interface (outlet for a cable or plug) between the switch and the computer/server/CPU to which it is attached.

Today, DCs and CDCs generally implement data center networking using a set of layer two switches. Layer two switches process and route data at layer 2, the data link layer, which is the protocol layer that transfers data between nodes (e.g. servers) on the same local area network or adjacent nodes in a wide area network. A key problem to solve, however, is how to build a large capacity computer network that is able to carry a very large aggregate bandwidth (hundreds of TB) containing a very large number of ports (thousands), that requires minimal structure and space (i.e. minimizing the need for a large room to house numerous cabinets with racks of cards), and that is easily scalable, and that may assist in minimizing power consumption.

The traditional network topology implementation is based on totally independent switches organized in a hierarchical tree structure as shown in FIG. 1. Core switches 2 are very high speed, low count ports with a very large switching capacity. The second layer is implemented using aggregation switches 4, medium capacity switches with a larger number of ports, while the third layer is implemented using lower speed, large port count (e.g. forty/forty-eight), low capacity Edge switches 6. Typically the edge switches are layer 2, whereas the aggregation ports are layer 2 and/or 3, and the core switch is typically layer 3. This implementation provides any server 8 to any server connectivity in a maximum of six hop links in the example provided (three hops up to the core switch 2 and three down to the destination server 8). Such a hierarchical structure is also usually duplicated for redundancy-reliability purposes. For example, with reference to FIG. 1, without duplication if the right-most edge switch 6 fails, then there is no connectivity to the right-most servers 8. In the least, core switch 2 is duplicated since the failure of the core switch 2 would generate a total data center connectivity failure. For reasons that are apparent, this method has significant limitations in addressing the challenges of the future CDC. For instance, because each switch is completely self-contained, this adds complexity, significant floor-space utilization, complex cabling and manual switches configuration/provisioning that is prone to human error, and increased energy costs.

Many attempts have been made, however, to improve switching scalability, reliability, capacity and latency in data centers. For instance, efforts have been made to implement more complex switching solutions by using a unified control plane (e.g. the QFabric System switch from Juniper Networks; see, for instance, http://www.juniper.net/us/en/productservices/switching/qfabric-system/), but such a system still uses and maintains the traditional hierarchical architecture. In addition, given the exponential increase in the number of system users and data to be stored, accessed and processed, processing power has become the most important factor when determining the performance requirements of a computer network system. While server performance has continually improved, one server is not powerful enough to meet the needs. This is why the use of parallel processing has become of paramount importance. As a result, what was predominantly north-south traffic flows, has now primarily become east-west traffic flows, in many cases up to 80%. Despite this change in traffic flows, the network architectures haven't evolved to be optimal for this model. It is therefore still the topology of the communication network (which interconnects the computing nodes (servers)) that determines the speed of interactions between CPUs during parallel processing communication.

This need for increased east-west traffic communications led to the creation of newer, flatter network architectures, e.g. toroidal/torus networks. A torus interconnect system is a network topology for connecting network nodes (servers) in a mesh-like manner in parallel computer systems. A torus topology can have nodes arranged in 2, 3, or more (N) dimensions that can be visualized as an array wherein processors/servers are connected to their nearest neighbor processors/servers, and wherein processors/servers on opposite edges of the array are connected. In this way, each node has 2N connections in a N-dimensional torus configuration (FIG. 2 provides an example of a 3-D torus interconnect). Because each node in a torus topology is connected to adjacent ones via short cabling, there is low network latency during parallel processing. Indeed, a torus topology provides access to any node (server) with a minimum number of hops. For example, a four dimension torus implementing a 3×3×3×4 structure (108 nodes) requires on average 2.5 hops in order to provide any to any connectivity. FIG. 4 provides an example of a 6×6 2-D torus, showing the minimum number of hops required to go from corner node 1.6 to all other 35 nodes. As shown, the number of hops required to reach any destination from node 1.6 can be plotted as a bell-curve with the peak at 3 hops (10 nodes) and tails generally at 5 hops (4 nodes) and 1 hop (4 nodes), respectively.

Unfortunately, large torus network implementations have not been practical for commercial deployment in DCs or CDCs because large implementations can take months to build, cabling can be complex (2N connections for each node), and they can be costly and cumbersome to modify if expansion is necessary. However, where the need for processing power has outweighed the commercial drawbacks, the implementation of torus topologies in supercomputers has been very successful. In this respect, IBM's Blue Gene supercomputer provides an example of a 3-D torus interconnect network wherein 64 cabinets house 65,536 nodes (131,072 CPUs) to provide petaflops processing power (see FIG. 3 for an illustration), while Fujitsu's PRIMEHPC FX10 supercomputer system is an example of a 6-D torus interconnect housed in 1,024 racks comprising 98,304 nodes. While the above examples dealt with a torus topology, they are equally applicable to other flat network topologies.

The present invention deals more specifically with the important issue of data packet traverse and routing from node to node in torus or higher radix network structures. In this respect, it is the routing that determines the actual path that packets of data take to go from source to destination in the network. For the purposes herein, latency refers to the time it takes for a packet to reach the destination in the network, and is generally measured from when the head arrives at the input of the source node to when it arrives at the input of the destination node. Hop count refers to the number of links or nodes traversed between the source and the destination, and represents an approximation for determining latency. Throughput is the data rate that the network accepts per input port/node measured in bits/sec.

A useful goal when routing is to distribute the traffic evenly among the nodes (load balancing) so as to avoid hotspots development (a pathway or node region where usage/demand has exceeded a desired or acceptable threshold) and to minimize contention (when two or more nodes attempt to transmit a message or packet across the same wire or path at the same time), thereby improving network latency and throughput. The route chosen therefore affects the number of hops from node to node, and may potentially even thereby affect energy consumption when the route is not optimized.

The topology under which a network operates also clearly affects latency because topology impacts the average minimum hop count and the distance between nodes. For instance, in a torus, not only are there several paths that a packet can take to reach a destination (i.e. in a torus there is "path diversity"), but there are also multiple minimum length paths between any source and destination pair. As an example, FIG. 5 shows examples of three minimal routes that a packet can take to go from node S 11 to node D 12 (3 hops) in a 2-D torus mesh, while a longer fourth route of 5 hops is also shown. The paths computation done through routing is done statically based on topology only—the source routing is dynamically based on packet source-destination pairs on hop by hop basis.

Routing methodologies that exploit path diversity have better fault tolerance and better load balancing in the network. Routing methodologies do not always achieve such goals, however, and can generally be divided into three classes: deterministic, oblivious and adaptive. Deterministic routing refers to the fact that the route(s) between a given pair of nodes is determined in advance without regard to the current state of the network (i.e. without regard to network traffic). Dimension Order Routing (DOR) is an example of deterministic routing, wherein all messages from node A to node B will always traverse the same path. Specifically a message traverses dimension-by-dimension (X-Y routing), thereby reaching the ordinate matching its destination in one dimension before switching to the next dimension. As an example, FIG. 6 can be used to show DOR, wherein a packet firstly travels along a first dimension (X) as far as required from node 1 to 5 to 9, followed by travelling along the second dimension (Y) to destination node 10. Although such routing is generally easy to implement and deadlock free (deadlock refers to a situation where an endless cycle exists along the pathway from source to destination), there is no exploitation of path diversity and therefore poor load balancing.

Routing algorithms that are "oblivious" are those wherein routing decision are made randomly without regard to the current state of the network (deterministic routing is a subset of oblivious routing). Although this means oblivious routing can be simple to implement, it is also unable to adapt to traffic and network circumstances. An example of a well-known oblivious routing method is the Valiant algorithm (known to persons skilled in the art). In this method, a packet sent from node A to node B is first sent from A to a randomly chosen intermediate node X (one hop away), and then from X to B. With reference again to FIG. 6, a Valiant algorithm could randomly chose node 2 as an intermediate node from source node 1 to destination node 10, meaning the path 1-2-3-7-11-10, for instance, could be used for routing purposes. This generally randomizes any traffic pattern, and because all patterns appear to be uniformly random, the network load is fairly balanced. In fact, the Valiant algorithm has been thought to be able to generally balance load for any traffic patterns on almost any topology. One problem however, is that Valiant routes are generally non minimal (minimal routes are paths that require the smallest number of hops between source and destination), which often results in a significant hop count increase, and which further increases network latency and may potentially increase energy consumption. There are exceptions, however, such as in a network where congestion is minimal. Non-minimal routing can significantly increase latency and perhaps power consumption as additional nodes are traversed; on the other hand, in a network experiencing congestion, non-minimal routing may actually assist in avoiding nodes or hotspots, and thereby actually result in lower latency.

If minimal routes are desired or necessary though, the Valiant algorithm can be modified to restrict its random decisions to minimal routes/shortest paths by specifying that the intermediate mode must lie within a minimal quadrant. As an example, with reference to FIG. 6, the minimal quadrant for node 1 (having a destination of node 10) would encompass nodes 2, 5, and 0, and would lead to a usual hop count of 3.

The Valiant algorithm provides some level of path selection randomization that will reduce the probability of hot spots development. There is a further conundrum, however, with affecting such efficiencies—Valiant routing is only deadlock free when used in conjunction with DOR routing, which itself fails with load balancing and hot spots avoidance.

Adaptive routing algorithms are those wherein routing decisions are based on the state of the network or network traffic. They generally involve flow control mechanisms, and in this respect buffer occupancies are often used. Adaptive routing can employ global node information (which is costly performance-wise), or can use information from just local nodes, including, for instance, queue occupancy to gauge network congestion. The problem with using information solely from local nodes is that this can sometimes lead to suboptimal choices. Adaptive routing can also be restricted to minimal paths, or it can be fully adaptive (i.e. no restrictions on taking the shortest path) by employing non-minimal paths with the potential for livelock (i.e. a situation similar to deadlock where the packet travel is not progressing to destination; often the result of resource starvation). This can sometimes be overcome by allowing a certain number of misroutes per packet, and by giving higher priority to packets misrouted many times. Another problem with adaptive routing is that it may cause problems with preserving data packet ordering—the packets need to arrive at the destination in the same order or otherwise you need to implement packet reordering mechanisms.

Lastly, it is important to mention that routing can be implemented by source tables or local tables. With source tables, the entire route is specified at the source, and can be embedded into the packet header. Latency is thereby minimized since the route does not need to be locked up or routed hop by hop at each node. Source tables can also be made to specify multiple routes per destination to be able to manage faults, and, when routes are selected randomly (i.e. oblivious routing), to increase load balancing. With local node tables, on the other hand, smaller routing tables are employed. However, the next step a packet is to take is determined at each node, and this adds to per hope latency.

The present invention seeks to overcome deficiencies in the prior art and improve upon known methods of routing packets in torus or higher radix network topologies.

SUMMARY OF THE INVENTION

In one aspect, the present invention provides a novel method to route data packets across a torus mesh or higher radix topologies to provide low latency, increased throughput, and hot spot and deadlock avoidance.

In yet another aspect, the present invention provides a method to implement traffic decorelation (randomization), increased efficiency in bandwidth allocation, load balancing and traffic engineering in a torus mesh or higher radix structures.

In one embodiment, the present invention provides a computer-implemented method of routing packets in a direct interconnect network from a source node to a destination node comprising the steps of: discovering all nodes and all output ports on each node in a network topology; including the discovered nodes and output ports in the network topology in a topology database in order to allow said nodes and ports to be included in shortest path routing computations; calculating the shortest path from every output port on each node to every other node in the network topology based on those nodes and output ports contained in the topology database; generating a source routing database on each node containing the shortest paths from every output port on said each node to all other nodes in the network topology; receiving packets at the source node; sending the received packets to the output ports of the source node in a round robin or weighted round robin manner, whereby each of said received packets is thereafter segmented into flits at the output port of the source node and distributed along the shortest path from the output port on the source node to the destination node, such that the packets are thereby distributed along alternate routes in the network topology; and re-assembling and re-ordering the packets at the destination node so that the packets accord with their original form and order.

In a further embodiment, the present invention provides a method of routing packets wherein the flits are forwarded to the destination node using wormhole switching.

BRIEF DESCRIPTION OF THE DRAWINGS

The embodiment of the invention will now be described, by way of example, with reference to the accompanying drawings in which:

FIG. 13 displays the pseudocode implementing the flit generation through packet segmentation;

FIG. 15 displays the pseudocode implementing the paths computation in accordance with the present invention;

FIG. 16 displays the source routing tables format generated by the paths computation in accordance with the present invention;

FIG. 19 displays the pseudocode implementing the flits transfer as described in the flowchart in FIG. 17, in accordance with the present invention;

FIG. 23 displays the pseudocode implementing the link and/or node failure detection in accordance with the present invention;

DETAILED DESCRIPTION OF THE INVENTION

The present invention utilizes a torus mesh or higher radix wiring to implement direct interconnect switching for data center applications. In particular, the present invention is particularly useful with the torus system described in related PCT Patent application no. PCT/CA2014/000652 entitled, "Method and Apparatus to Manage the Direct Interconnect Switch Wiring and Growth in Computer Networks", filed Aug. 29, 2014, the disclosure of which is incorporated herein by reference. Such architecture can provide a high performance network interconnect having tens of thousands of servers in a single switching domain.

Figure 11:
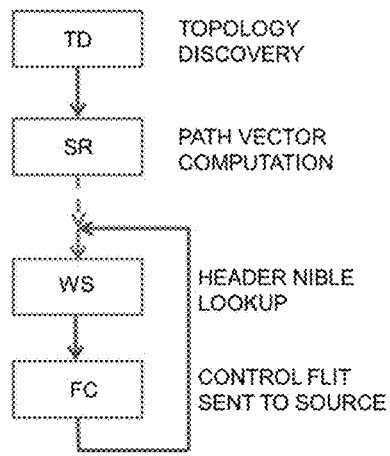
FIG. 11 shows a high level diagram presenting the software components: TD, SR, WS, FC in accordance with the present invention.

The software that controls the switch follows the Software Defined Networks model. The switch control plane (Switch OS) preferably runs on a separate server but interacts closely with the distributed processing running on each PCIe card. With reference to FIG. 11, key software components include the Topology Discovery (TD), the packet Routing (SR) across the topology, the wormhole switching (WS), the Flow Control (FC) mechanism, and the Switch Status Monitoring and Switch management. The TD component is responsible for essentially discovering the presence (or absence) of nodes in the torus mesh (and thereby allowing for the updating of possible paths based on node presence); the SR component is responsible for source routing calculations (all the paths available from every port of the source node to any destination node); the WS component is responsible for flit steering across the torus based on the path vector, which is included in the flit header, with minimum latency (cut through model at every node); the FC component is responsible for torus links utilization and control messages to the source in order to regulate the traffic through the input queuing mechanism; the switch status monitoring component is responsible for traffic balancing, traffic reroute in failure conditions and support for switch growth; and the switch management component is responsible for maintaining a complete image of the switch, including all the interconnected servers, all the interconnected I/O links to the outside world, and connectivity status.

The present invention primarily relates to the novel topology discovery (TD component) and routing protocol (SR component) of the present invention—key functions particularly useful for implementation on the novel switch architecture disclosed in PCT Patent application no. PCT/CA2014/000652. While traditional implementations of routing data packets through a torus structure makes an implicit assumption, namely that the traffic is randomly distributed across the destination nodes, practical implementations have actually shown switch failures in the case of single source/single destination continuous packet flow at maximum capacity, due to hotspots development that propagates across the torus, and which has the capacity to completely disable the ability to transfer packets across the torus mesh. The present invention is therefore referring more specifically to routing optimisation and implementation for direct interconnect network topologies such as torus and higher radix networks in order to address performance issues and hot spots development for any type of traffic (whether large flows from any source to any destination (highly correlated) or traffic to randomly distributed destinations (typical internet traffic)). Contrary to the known methods of routing packets in a torus, as previously described above, the present invention describes a method of discovering and updating all nodes in the topology, and a method of routing packets wherein the shortest path(s) are calculated at each node on every output port (e.g. x+, x−, y+, y−, z+, z−, w+, and w−) to every destination node, and whereby the packets are distributed along paths from each output port in a round-robin manner or weighted round-robin manner (i.e. promoting multiple alternate paths) to increase bandwidth and traffic distribution to avoid hotspots. The flow control (FC) mechanism is used to adaptively change the output port selection for packet routing from a simple round-robin, consecutive, source node output port selection (i.e. first port x+, next x−, then y+, y−, z+, z−, w+, and w−) to a weighted round-robin where the links identified by FC as busy are skipped, or the traffic on those ports is reduced to a low percentage (e.g. 10%) of maximum link capacity.

Data packet reordering is implemented at the node destination. Such a method can take particular advantage of the novel method of node (server) discovery discussed in PCT Patent application no. PCT/CA2014/000652, and further discussed herein. The present invention therefore addresses the issue of packet routing optimization for direct interconnect network topologies such as torus or higher radix networks, in order to address performance issues and hotspots development for any type of traffic, whether that be large flows from any source to any destination (highly correlated) or traffic to randomly distributed destinations (typical internet traffic).

Figure 1:
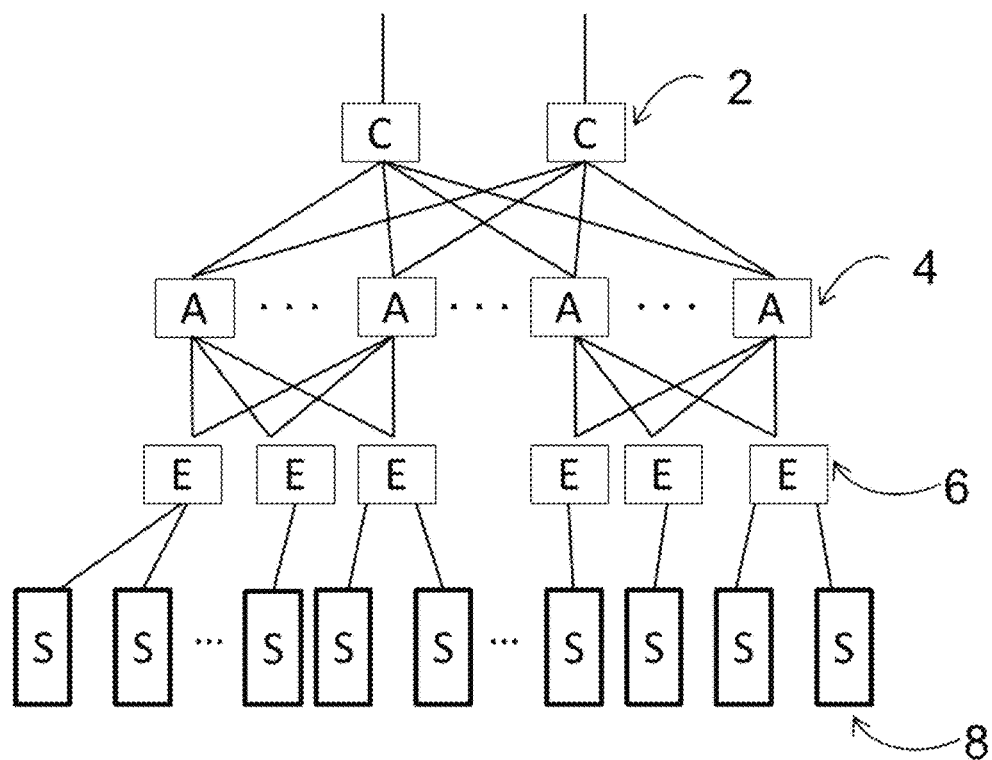
FIG. 1 is a high level view of the traditional data center network implementation.
Figure 2:
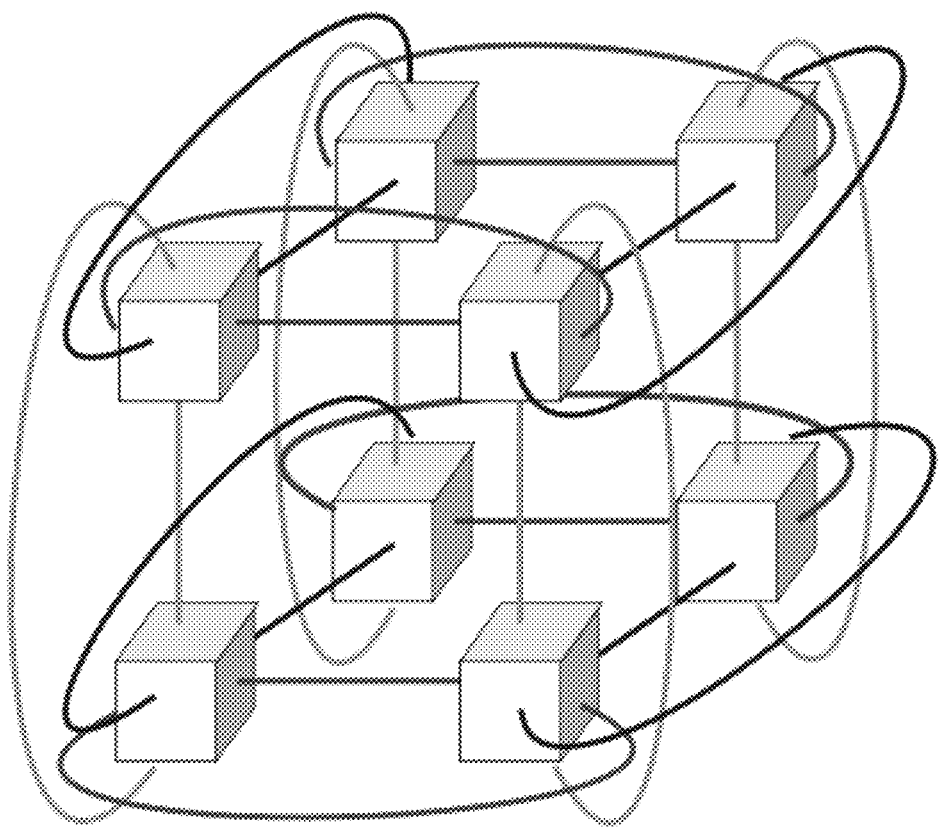
FIG. 2 is diagram of a 3-dimensional torus interconnect having 8 nodes.
Figure 3:
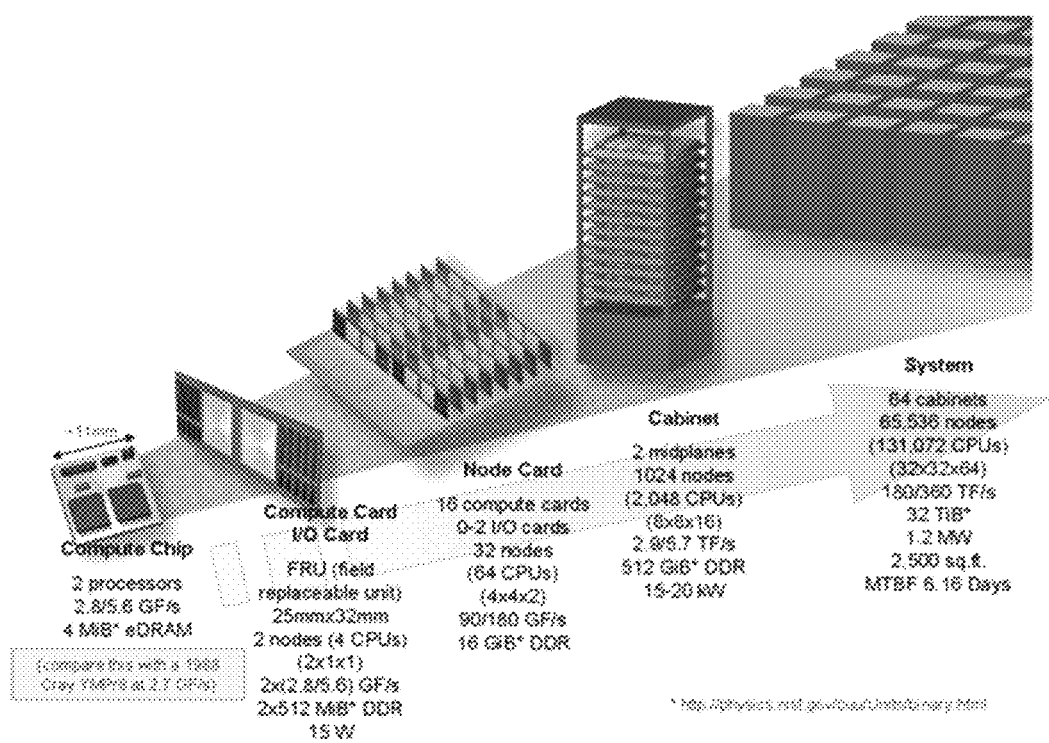
FIG. 3 is a diagram showing the hierarchy of the IBM Blue Gene processing units employing torus architecture.
Figure 4:
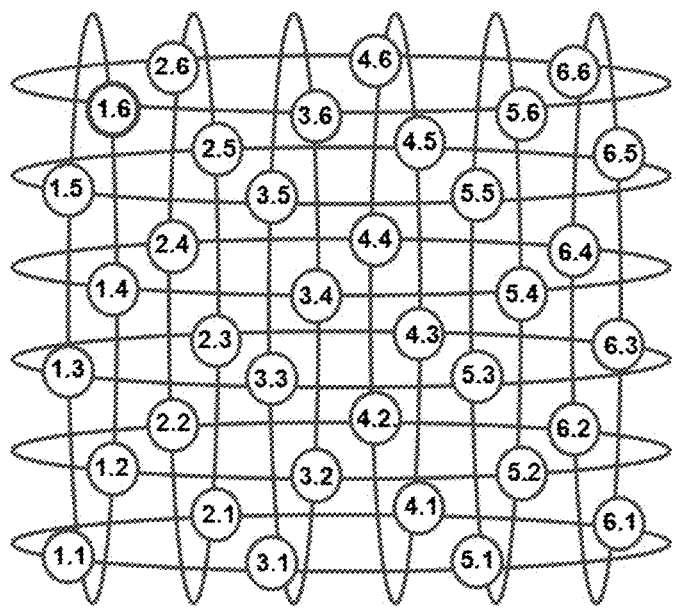
FIG. 4 is a high level diagram of the 36 nodes in a 6×6 2-D folded torus that displays the minimum number of hops required to reach any of the 35 nodes starting from corner node (1.6)
Figure 5:
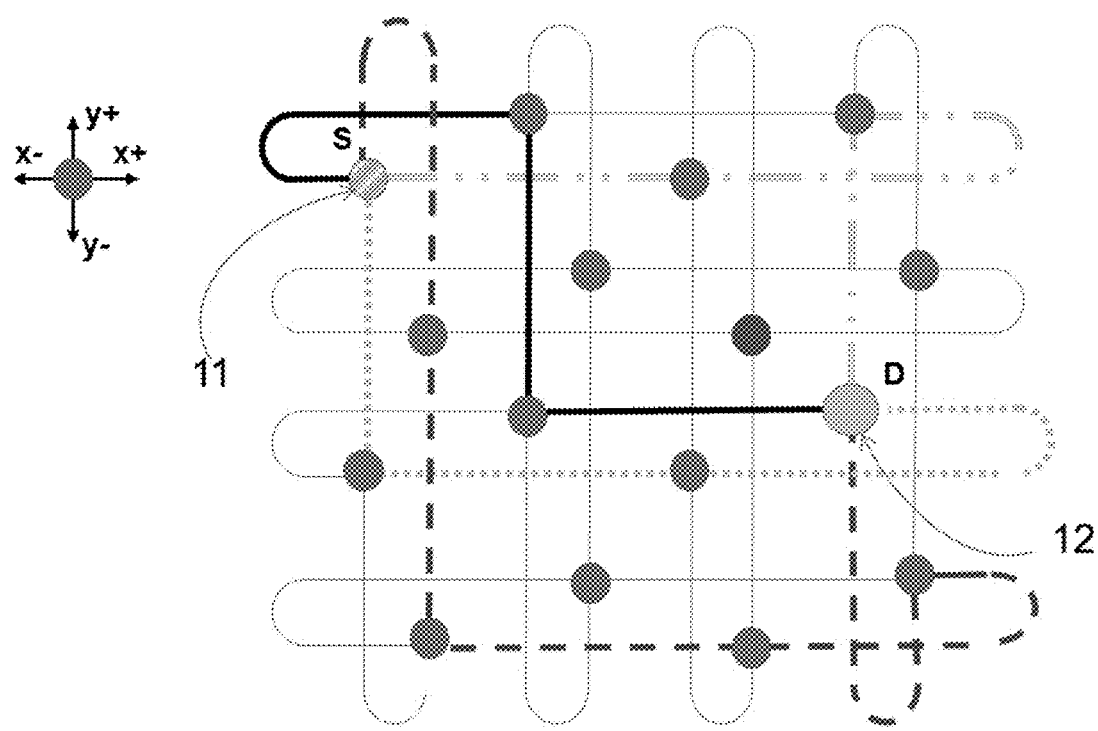
FIG. 5 is a diagram of a 4×4 2-D torus implementation displaying several routes starting from node S to node D on every port (x+, x−, y+, y−) of node S.
Figure 6:
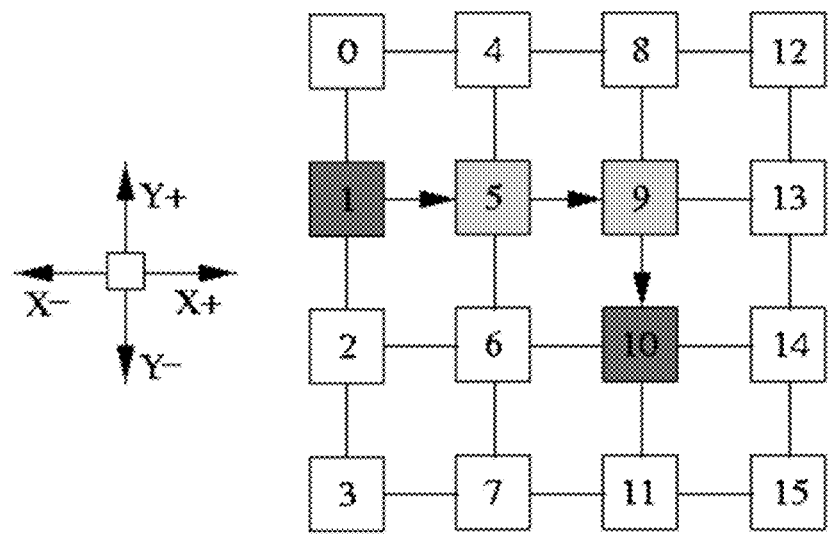
FIG. 6 is a diagram of a simple network topology to assist in showing how various routing algorithms could route a packet from node to node.
Figure 7:
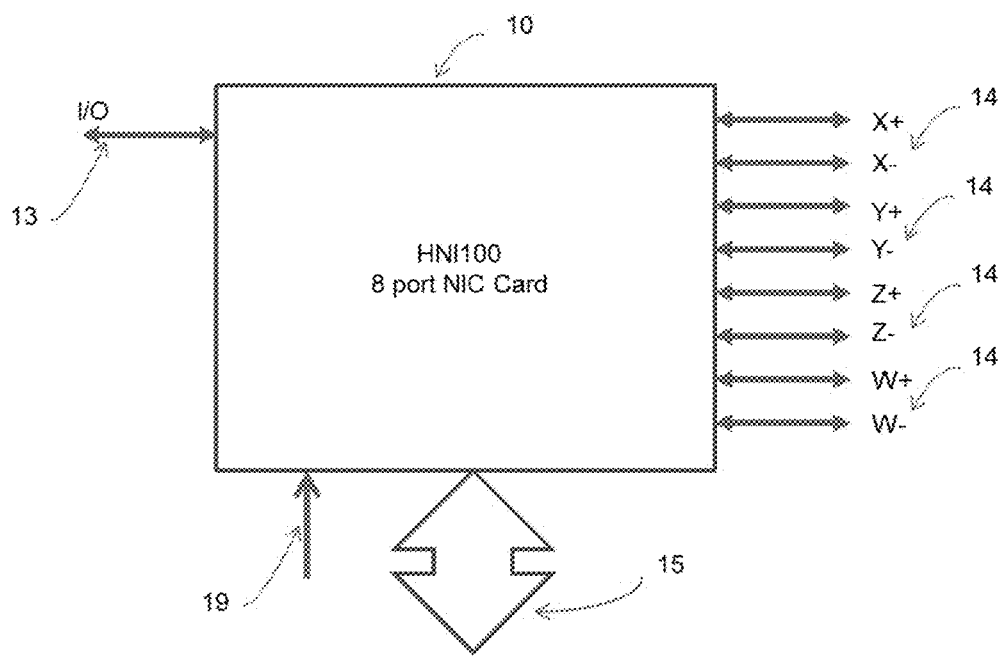
FIG. 7 is a high level diagram of a high speed Network Interface Card with all the ports in accordance with the system of present invention.

First of all, FIG. 7 displays a high level diagram of the high speed Network Interface card 10 with all the ports: the I/O port 13 to access the outside world (N-S interface), the 4D torus interconnect ports 14, the PCIe port 15 to access the compute server and the control 19. A person skilled in the art would understand that the present invention could work with HNI cards having fewer or more ports, and in association with other torus or higher radix topologies (such as "dragonfly" for example).

Figure 8:
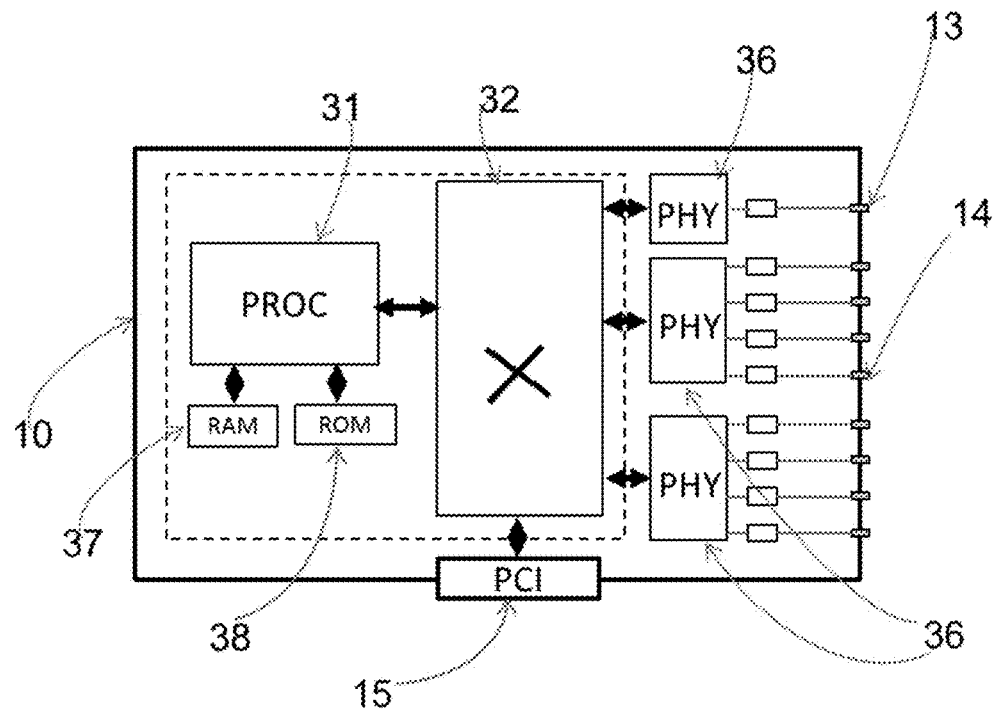
FIG. 8 is a high level diagram of a Host Network Interface (HNI) card showing the key functional blocks in accordance with the system of the present invention.

FIG. 8 shows a high level diagram for the HNI card 10 in accordance with the system of the present invention with the key functional blocks, including the processor 31 with RAM 37 and ROM 38, the switching block 32, the physical interface devices 36, the torus interconnect ports 14, the I/O port 13 and the PCIe port 15. The physical implementation of this embodiment is based on a multicore processor with attached memories and PHY devices to implement the torus interconnect. The switching function is implemented in software using the processor's hardware acceleration assist capability to support multiple queues manipulation. A person skilled in the art would understand that the present invention would also work if the physical implementation differs. i.e if the switching function acceleration is implemented in FPGA or ASIC, or, that the processor does not have to reside on the same card as the card used for the switching function.

Figure 10:
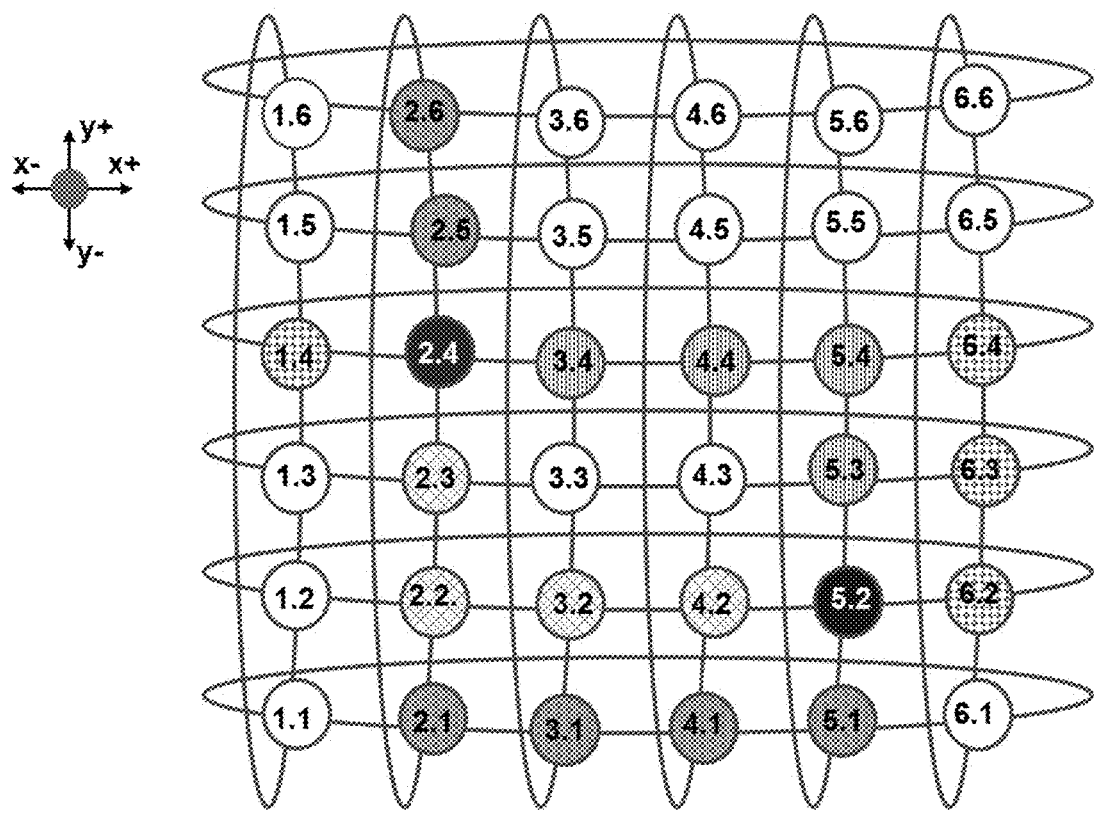
FIG. 10 is a diagram showing the routes and the number of hops starting from each port on node S (2.4) to each port on node D (5.2) in a 36 node 2-D torus structure.

FIG. 10 displays a simple 2D torus wiring diagram for use in explaining packet routing in accordance with the present invention. As shown, the structure is a folded 2D torus wherein the length of each connection is equivalent throughout. Each node in this diagram represents a server interconnected via a PCIe switch card (described above) that is housed in the server. The diagram shows the shortest maximum disjoint paths (no links or nodes in common) from the ports of source node S (2.4) to destination node D (5.2) starting on the various dimensions (x+, x−, y+, y−), as calculated at the source node S. In this respect, FIG. 10 shows three calculated paths and the routing vectors as having a minimal hop count of 5 hops (from (S) 2.4: (x+, x+, x+, y−, y−); from (S) 2.4: (y−, y−, x+, x+, x+); and from (S) 2.4: (x−, x−, y−, y−, x−), while another path is calculated as having a non-minimal hop count of 7 hops (from (S) 2.4:

(y+, y+, y+, x+, x+, x+, y+)). Assuming large traffic between the source S and D nodes, the packets/flits will be sent on the shortest path to node D starting on each source node S output port to the destination node along the path from each output port in a round-robin or weighted round-robin manner, thereby using multiple paths to increase the bandwidth on one hand and distributing the traffic to avoid hot spots development (weighted round-robin selection of output ports at the source node would increase the number of packets along certain paths). A second alternate route may also computed and stored at each node, whereby, other than the first hop, the routes provide alternate, separate paths to assist in the case of link or node failures to overcome traffic congestion, and hotspots as necessary. The present method distributes the traffic across the torus or higher radix network for load balancing purposes, but can introduce packet reordering. For instance, since the path starting on y+ (FIG. 10) is 2 hops longer than the minimal paths (5 hops), all the packets sent on this path will arrive with an extra delay that can generate packet reordering issues. Packets therefore have to be re-ordered at the destination node in accordance with the present invention. This is within the skill of a person skilled in the art.

Figure 9:
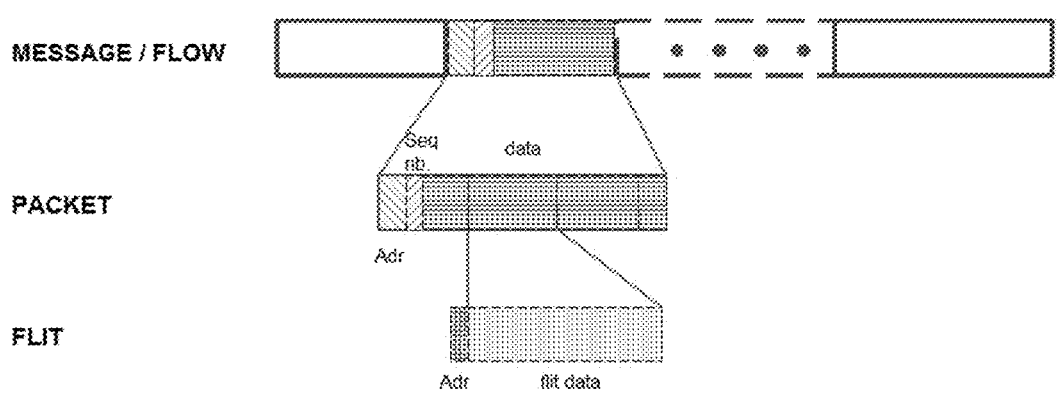
FIG. 9 is a high level view of packet segmentation required to implement packet transfer across a torus mesh.

With reference to FIG. 9, which shows a high level view of packet segmentation, it is important to note that packets traversing the direct interconnect tori or higher radix are segmented into smaller sized packets (flits) during routing. Packet segmentation is required across the torus mesh in order to avoid "Head of Line Blocking", a common condition in packet networks using common resources (links and buffers). The size of the flit is determined by the traffic type in order to minimize overhead tax, and the practical value ranges between 64 and 512 bytes. It is important to note that the present invention is able to handle Ethernet packets, Infiniband packets, PCIe streams or NVMe transactions, among possible others. The flits across the torus structure are transparently carrying the traffic. The external interface I/O port 13 is specific to the type of traffic and terminates the user traffic, transferring the data across the torus to a destination PCIe port 15 transparently via "flits". It is important to note that the present invention is able to handle Ethernet packets across the torus (via Ethernet flits). A key advantage herein is the variable size of the flit, since the flit for an Ethernet packet has the packet delineation mechanism. Therefore, the flit size is variable from 64 bytes (the minimum Ethernet packet size) to 512 bytes (payload and headers). If the packet is larger than 512 bytes the system will segment the original packet into flits of 512 bytes: the Head flit, the Body flit, and the Tail flit.

Figure 12:
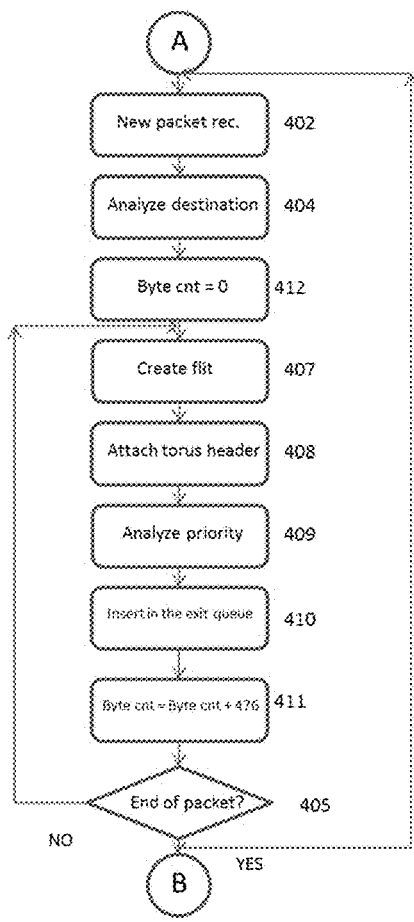
FIG. 12 shows a flowchart for the process of packet segmentation in accordance with the present invention.

FIG. 12 provides a flowchart presenting the method of packet segmentation. Once a new packet is received (step 402) from the host (i.e. PCIe interface), the HNI processor extracts the header in order for the processor to analyse the packet's destination (step 404) and the routing paths. At this stage, the packet enters the segmentation loop. The bytes counter is initialized (step 412) and End of Packet—EOP—analyser (step 405) detects the EOP, and if the counter is less than or equal to 476 bytes (i.e. the payload is less than or equal to 476 bytes), the packet is sent to flit generator (step 407), the header generator (step 408) and priority decision block (step 409). The flit is thereafter inserted into an assigned exit queue (step 410) for transmission to the next hop across the torus mesh, and we look to see if a new packet has been received (402). The byte counter is incremented (step 411) after each individual flit, the packet fragment is sent to the flit generator (step 407) and the process follows the steps described above until the last flit in the packet is reached and transmitted. As a key observation the flits on the torus links are preferably 512 bytes (476 bytes payload and 36 bytes header) followed by 8 "idle" bytes. If the packet is shorter than 476 bytes the flit (usually the Tail flit) will have less than 512 bytes and the packet delineation will be done using the "idle" bytes. FIG. 13 provides pseudocode implementing flit generation through packet segmentation.

Figure 14:
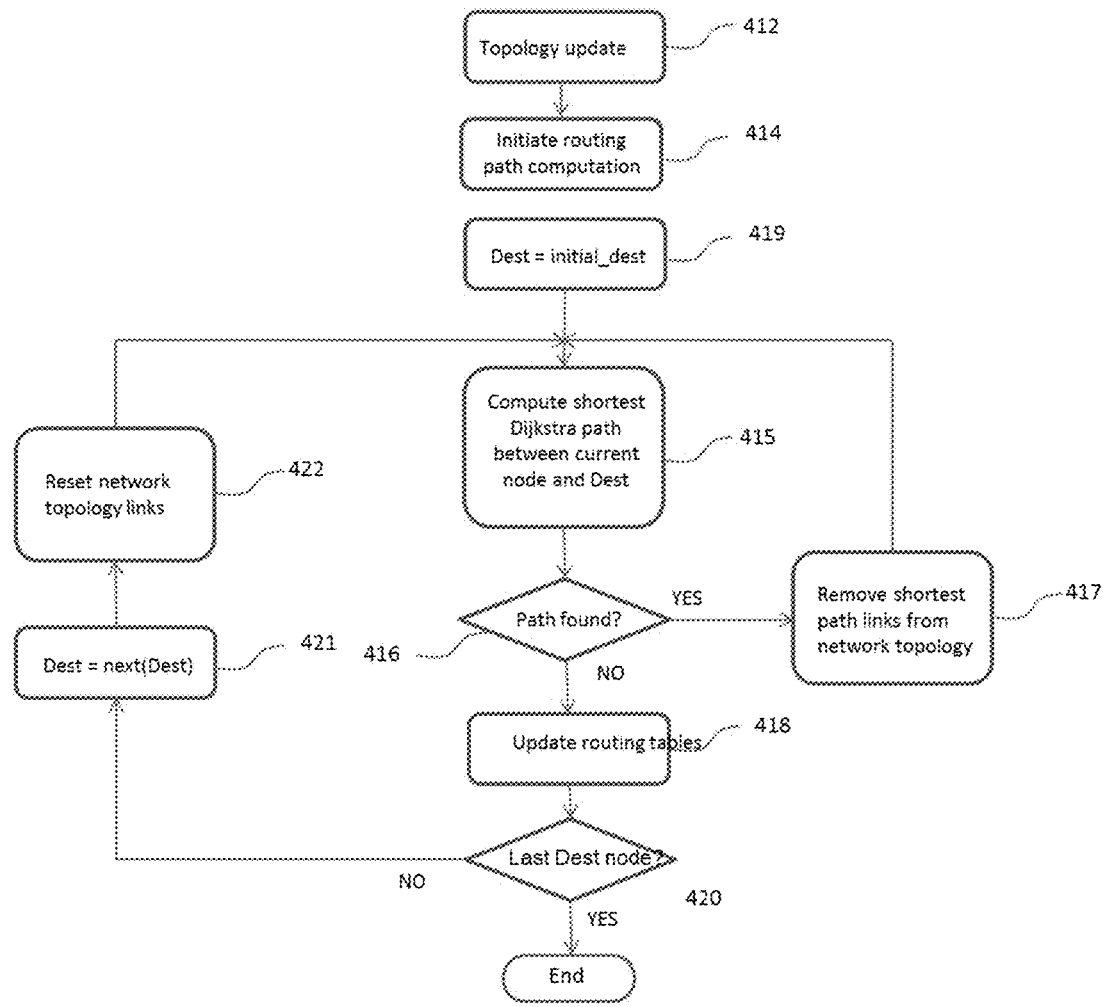
FIG. 14 displays a flowchart of the processing steps to prepare the source routing from each port in accordance with the present invention.

At the destination, flits are assembled into packets by stripping the torus header, and using the "Byte cnt" for offset of flit in the original packet. A person skilled in the art would know to implement for the destination node a per-source-packet-queue, create the ordered list of packet fragments, and release the packets once fully assembled, in original sequence. FIG. 14 shows the flowchart presenting the route computation according to the invention. The present invention also provides the pseudo code at FIG. 15 to compute all the paths from the source node to any destination node (source routing) that are maximally disjoint (no links and nodes in common) on each output port of the source node. The topology update function 412 (which discovers active servers/nodes and active ports thereof) will initiate route/path computation (414) as soon as an update is detected (i.e. whenever nodes have been added/deleted or there are critical problems/faults associated therewith). According to the invention the shortest path will be computed (step 415) using Dijkstra algorithm, between the current node and each destination node from the topology, as described in steps 419 (first Destination node found in the topology list) followed by steps 420 and 421 (search for all destination nodes in the topology list). In step 422, all path costs affected by step 417 are reset to the initial value. The computed shortest path from source to destination will be stored in the source routing data base and it will be removed from further shortest path computations (in order to provide for disjoint paths) by increasing the cost on all links belonging to the stored path to infinity (417)—this will have the practical effect of removing the nodes and the links from the topology data base to force non-reuse for disjoint path selection purposes. The process continues until all the output ports will be used and all possible paths between the source node and the destination node are stored in the data base. The results are then summarized in the output routing table (418) as the routing vector for each node, where routing is to begin with shortest path first. Shortest path computation itself can be implemented using the Dijkstra algorithm, a well-known method used in routing protocol implementations. What is particularly novel herein is that the shortest path is determined at every output port and used accordingly.

FIG. 16 presents the format of the routing output table. Each route has a number attached representing the number of hops for the specific path and the list/vector of the output ports to be selected on each hop. In particular, FIG. 16 presents an example snapshot of the output table for the routes in a 4-D torus (8×8×8×8) with 8 ports (x+, x−, y+, y−, z+, z−, w+ and w−), from the source node number 1000 to the destination node 0 (the use of node 1000 and node 0 are simply for example purposes). It is to be noted that the first output selection in the grouping of 8 routes (i.e. x+, y+, z+, w+, x−, y−, z− and w−) in the first group of 8 routes, for instance, corresponds to each output port of the source node. The 8 paths are totally disjoint and with different lengths: 5 hops, 7 hops or 9 hops. The feature that is most important is the paths distribution across the torus which enables traffic distribution and predictable performance. The second group of 8 paths in FIG. 16 represents the second alternative for the routing paths. The method may compute many alternate routes but the distance (number of hops) will get larger and larger. For practical reasons the method may generally only store the first option of 8 distinct paths if desired.

Figure 17:
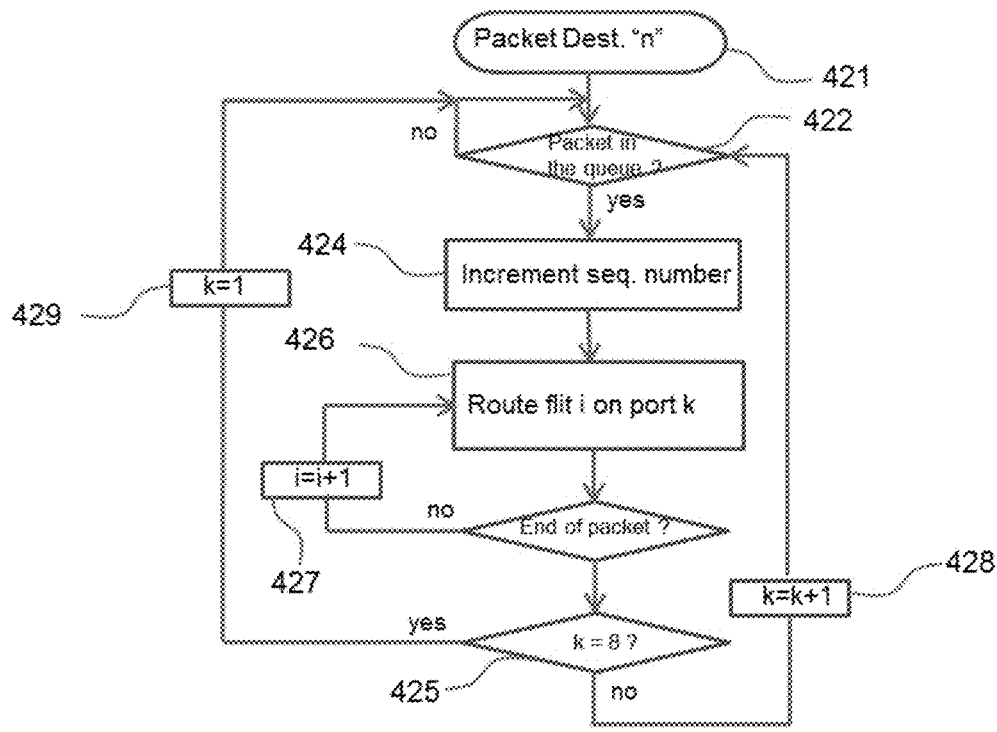
FIG. 17 displays a flowchart for the process of transferring the "flits" on each port in accordance with the present invention.

FIG. 17 shows a flowchart representing the steps used in packet switching in accordance with the present invention.

Figure 18:
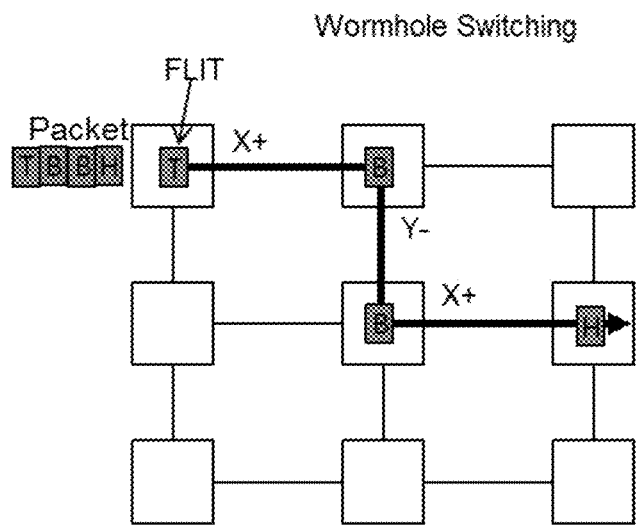
FIG. 18 displays the wormhole switching process of transferring the "flits" on each port in accordance with the present invention.

As new packets are pushed into the output queue the packet transfer state machine initiates the transfer across the torus. In this respect, the output port "k" in question (ports 1 to 8 i.e. the output port discussed above: x+, y+, z+, w+, x−, y−, n− and w−) is used to transfer the flits following a wormhole model (as shown in FIG. 18): the Head flit and subsequent flit increments (Body flits), will be transferred along the same path from port k until the end of packet (the Tail flit) is reached as shown in FIG. 17. Once the end of packet is reached the counter k increments to refer to the next output port and the next packet with the next packet identifier (designated the next ordered packet) is transferred on the torus on a flit by flit basis using this wormhole switching model. Once the end of the packet is detected, the port number is incremented again (i.e. k=k+1) and the next packet will be transferred and so on. This implementation will distribute the packets sourced by one node on all the output ports 14 of the node, in a round robin model in order to decorelate the long flows to specific destinations and avoid "hot spots" development in the torus mesh. A person skilled in the art would understand that this distribution method can be modified as desired to increase performance, if necessary, for different types of traffic distributions. For instance, you can replace the round-robin with a weighted round-robin or any other user defined method. The method of the present invention has been found to perform better than a Valiant oblivious distribution, and is very consistent and predictable in results. This is very significant from the standpoint of performance of a network. FIG. 19 displays the pseudocode implementing the flits transfer as described and shown in the flowchart at FIG. 17.

Figure 20:
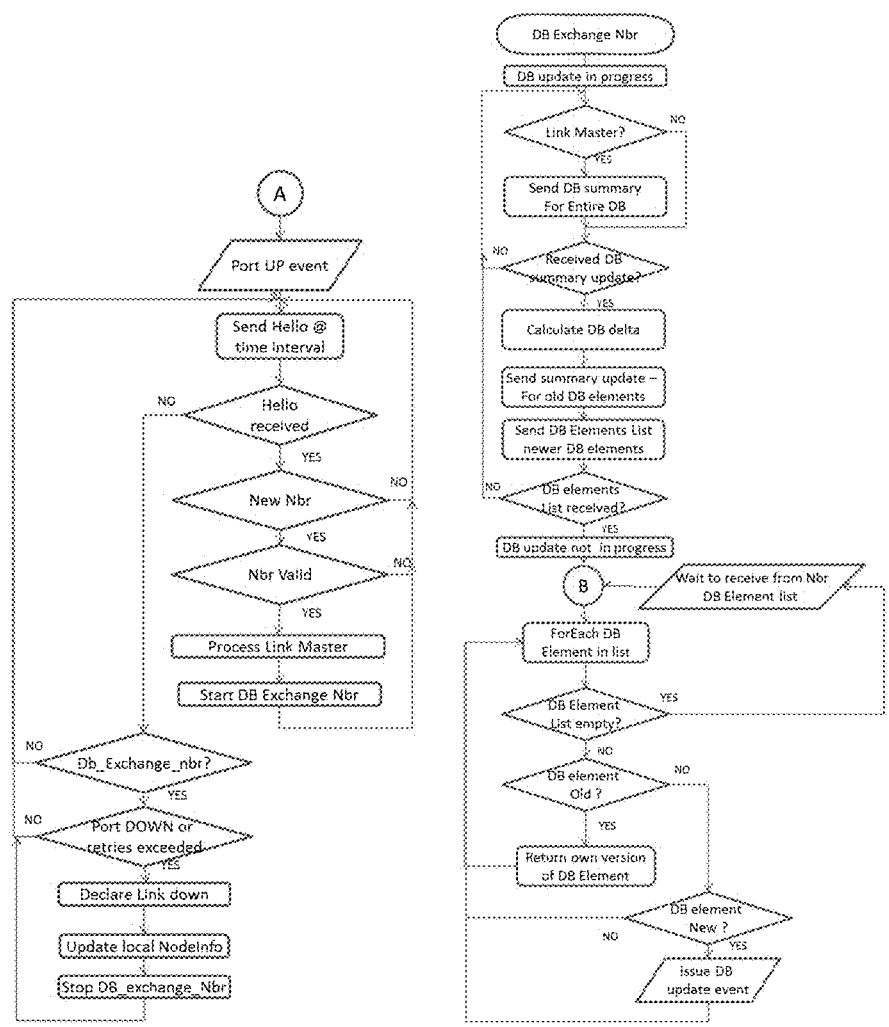
FIG. 20 displays a flowchart for discovering nodes or links triggering the topology discovery process for topology update.

FIG. 20 shows a flowchart presenting a method of topology discovery in accordance with the present invention. As noted above, the Topology Discovery component (TD) is important for essentially discovering the presence (or absence) of nodes (and node ports) in the torus mesh, which nodes/ports may then be used in the routing distribution above. In this respect, the TD allows the novel network of the present invention, as particularly disclosed in PCT patent application no. PCT/CA2014/000652, to scale in a simplified and efficient manner. The TD is based on "Hello" protocol and database exchange protocol. In particular, the "Hello" message is sent and received on every node and every port. Once a message is received as "Hello", and the node ID in the "Hello" packet is validated by the administrative framework, the local node information is updated to indicate availability of the new link to the neighbor. The collection of the node information is maintained on each node in the neighbor data base and synchronized with the neighbors through the Data Base exchange protocol. Each node sends its changes to the neighbor Data Base to the neighbor nodes, propagating step by step the entire topology. After a specific timeout, if changes to the neighbor data base occurred, a function call is generated for paths computation. For the "Hello" message exchange, neighbor to neighbor continues forever at a defined time interval, in order to detect changes in topology.

Figure 21:
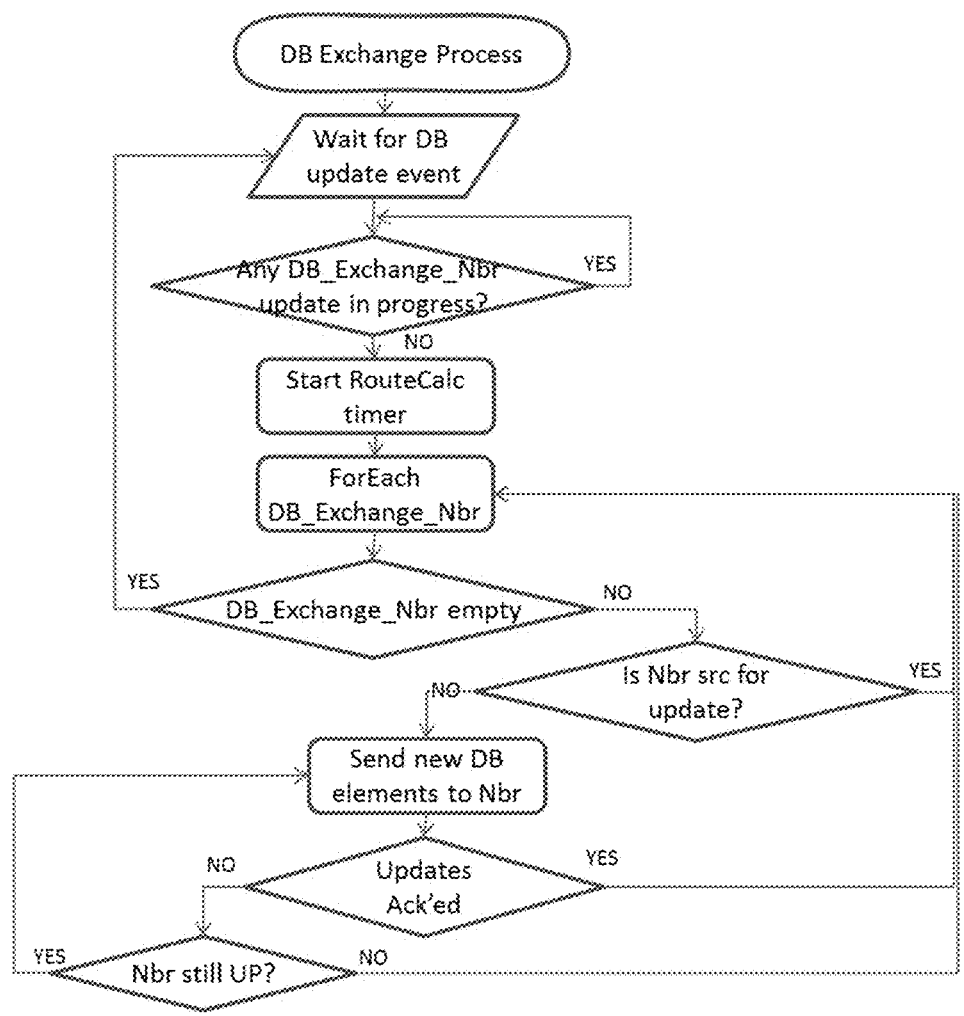
FIG. 21 displays a flowchart for describing the topology data base update.

FIG. 21 shows the flowchart presenting the DB exchange update for topology discovery according to the invention.

This essentially relates to the TD component, which is responsible for maintaining the complete image of the switch in each node, including all the interconnected servers and Input/Output links and connectivity status.

Figure 22:
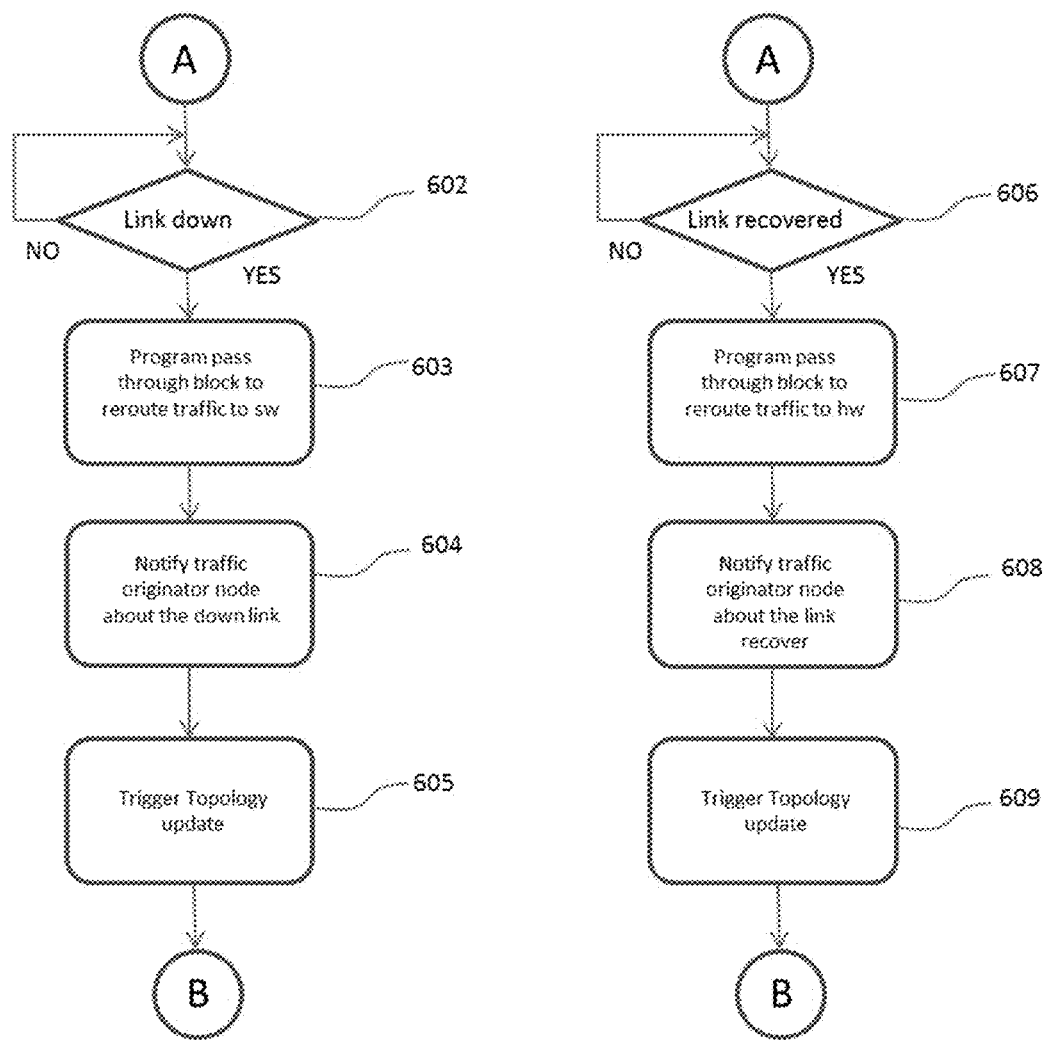
FIG. 22 shows a flowchart for the process of node and/or link failure detection and recovery and the process of topology update.

FIG. 22 provides a flowchart presenting how the system of the present invention discovers node/link failure detection and the process of re-routing to avoid the failed node. As a link failure is detected 602, the pass-through block is programmed so that traffic destined for the failed link is rerouted to CPU 603 The traffic source is notified to send traffic avoiding the failed link 604. This triggers a topology update event 605

As a link recovery is detected 606, the pass-through block is programmed so that traffic destined for the CPU because of the failed link is rerouted back to the same link 607.

The traffic source is notified to send traffic in the same way before the link failure 608. This triggers a topology update event 609. A similar process will occur in the case of a link cut. FIG. 23 provides the pseudocode for the link/node failure detection and recovery.

One embodiment of the invention is the method for new node insertion. In order to insert a node the wiring interconnecting the existing nodes is interrupted (link cut). As the torus wiring interruption is detected 602, the traffic reroute API is invoked 604. The link cost is set to infinity and the topology is updated (computing the shortest (lower cost) path for all the switch nodes). This defines the routes that will be used to control the packet flows to reach any destination. The new node insertion triggers the neigbors discovery. The management software checks the new node ID and compares with the provisioned data base. If the node is valid, the software initiates the process of topology update and the routes computation. The management data base will be updated with the new node and the node status will be set as active.

Although specific embodiments of the invention have been described, it will be apparent to one skilled in the art that variations and modifications to the embodiments may be made within the scope of the following claims.

We claim:

1. A computer-implemented method of routing packets in a direct interconnect network from a source node to a destination node comprising the steps of:
   discovering all nodes and all output ports on each node in a network topology;
   including the discovered nodes and output ports in the network topology in a topology database in order to allow said nodes and ports to be included in shortest path routing computations;
   calculating the shortest path from every output port on each node to every other node in the network topology based on those nodes and output ports contained in the topology database;
   generating a source routing database on each node containing the shortest paths from every output port on said each node to all other nodes in the network topology;
   receiving packets at the source node;
   sending the received packets to the output ports of the source node in a round robin or weighted round robin manner, whereby each of said received packets is thereafter segmented into flits at the output port of the source node and distributed along the shortest path from the output port on the source node to the destination node, such that the packets are thereby distributed along alternate routes in the network topology; and
   re-assembling and re-ordering the packets at the destination node so that the packets accord with their original form and order.

2. The computer-implemented method of claim 1 wherein the flits are forwarded to the destination node using wormhole switching.

\* \* \* \* \*